May 29, 1962   R. E. LARSEN ET AL   3,036,312
FISHING ROD ATTACHMENT FOR ARTIFICIAL ARM
Filed Feb. 29, 1960

INVENTORS.
Ralph E. Larsen
BY Jack R. Scott
Hovey, Schmidt, Johnson & Hovey
ATTORNEYS.

3,036,312
FISHING ROD ATTACHMENT FOR ARTIFICIAL ARM
Ralph E. Larsen, P.O. Box 186, Osceola, Mo., and Jack R. Scott, 517 E. Grand River, Clinton, Mo.
Filed Feb. 29, 1960, Ser. No. 11,512
8 Claims. (Cl. 3—12.8)

This invention relates to a device for permitting a person having an artificial arm to more effectively use fishing equipment in the nature of a casting rod or spinning rig. The novel apparatus is especially useful to allow persons having one artificial arm to use fishing rods and the like with substantially the same agility and effectiveness as fishermen without a similar handicap.

It is the primary object of the invention to provide a device for enabling a handicapped person to hold a fishing rod with an artificial arm which is designed so that the rod may be held with the artificial arm while the fisherman's hand is free to operate the reel, but with the rod being readily detachable from the artificial arm whenever it is desired to make another cast or to perform other movements with the rod.

It is another significant object of the invention to provide a device of the character described which is adapted to be mounted on conventional artificial arms without modification of the same. In this respect, an additional important object is to provide an appliance as defined which is simple in construction, may be produced at a relatively low unit cost and is resistant to deterioration under the wet conditions encountered in normal utilization of the same.

A further important object of the invention is to provide an appliance for permitting a handicapped person to hold a fishing rod with an artificial arm, wherein it is unnecessary to change or in any manner modify the rod itself if of a certain type or only minor modification being required of all other types, and wherein the rod may be held with the artificial arm at any desired angle during operation of the reel by the fisherman with his free hand.

A particularly important object of the invention is to provide a fishing rod holding device for an artificial arm permitting very rapid disengagement of the rod from the artificial arm, regardless of the exigencies of the situation, and accomplished by the fisherman grasping the handle of the rod with his free hand, moving the rod toward his body a short distance to disengage the latter from the artificial arm, whereupon the rod may then be moved as desired by the sportsman.

Other important objects and details of construction of the present invention will become obvious or be described in greater detail as the following specification progresses.

Figure 1:
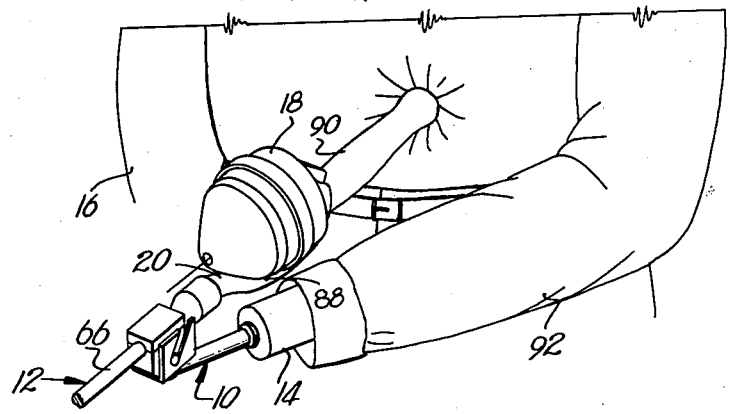
FIGURE 1 is a fragmentary perspective view illustrating the present device and showing the way in which a handicapped person may employ the same to hold a fishing rod with his artificial arm.

The device 10 illustrated in the drawing in its preferred form, is especially adapted for permitting a handicapped fisherman to hold a fishing rod 12 with his artificial arm 14 so that his other arm 16 is free to operate reel 18 mounted on handle section 20 of rod 12.

Device 10 includes an elongated bar 22 having an externally threaded end 24 adapted to be complementally threaded in a suitable recess 26 in the outer end 28 of arm 14. An integral, circumferentially extending flange 30 between the main part of bar 22 and the threaded end 24 thereof, limits threading of bar 22 into recess 26.

Figure 2:
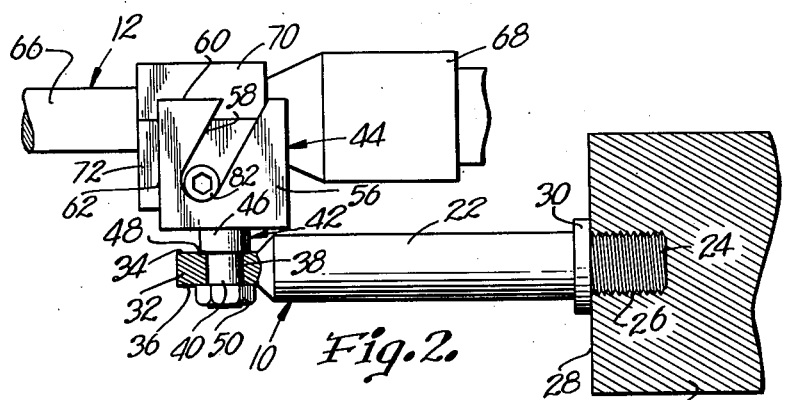
FIG. 2 is an enlarged, fragmentary, side elevational view of the instant fishing rod holding device, with certain parts thereof being broken away and in section to reveal details of construction of the same.
Figure 3:
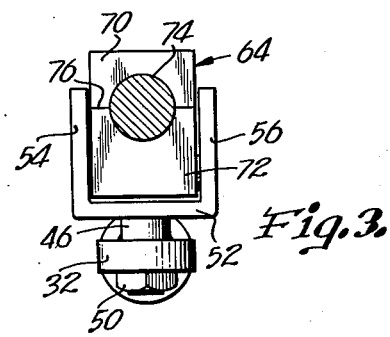
FIG. 3 is an enlarged, end elevational view of the fishing rod holding device, with the rod being illustrated in section.
Figure 4:
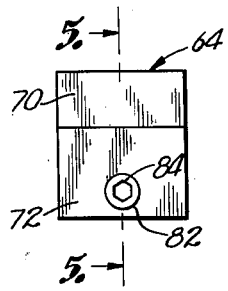
FIG. 4 is an enlarged, side elevational view of the clamp element adapted to be releasably secured to the fishing rod.
Figure 5:
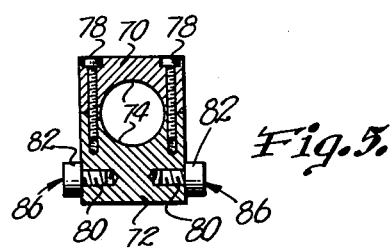
FIG. 5 is a vertical cross-sectional view taken on the line 5—5 of FIG. 4.

The end 32 of bar 22 remote from end 24 thereof is flattened, as best shown in FIGS. 2 and 3, to present a pair of opposed, parallel, flat surfaces 34 and 36. End 32 is provided with a transversely extending bore 38 therethrough in perpendicular relationship to the longitudinal length of bar 22 and adapted to rotatably receive the reduced cylindrical section 40 of a shaft 42 connected to U-shaped coupling member broadly numerated 44. As illustrated in FIG. 2, main cylindrical section 46 of shaft 42 is of greater diameter than bore 38 so that the shoulder 48 presented between sections 40 and 46 is in flat engagement with surface 34 of end 32. The outer extremity of section 40 remote from section 46 extends downwardly from surface 36 of end 32 and is externally threaded to complementally receive a lock nut 50. It is to be appreciated that a pair of lock nuts may be utilized on the threaded end of section 40 if desired.

Coupling member 44 includes a rectangular bight portion 52 integral with a pair of opposed, parallel, rectangular side portions 54 and 56, each of which has an elongated, obliquely disposed slot 58 therein extending from the upper margin 60 of each portion 54 and 56 downwardly toward the normally forward edges 62 of each of the sides 54 and 56. The configuration and disposition of slots 58 is clearly illustrated in FIG. 2.

A clamping element broadly numerated 64 and adapted to be connected to shaft 66 of rod 12 adjacent coupling nut 68 of the latter, includes a pair of opposed, polygonal blocks 70 and 72. Blocks 70 and 72 have opposed, parallel, semicylindrical grooves 74 in normally opposed, proximally disposed flat faces 76 thereof and of a size to complementally receive shaft 66 therewithin, as shown in FIG. 3. Screws 78 on opposed sides of grooves 74, extending through block 70 and threaded into block 72, serve to interconnect the same and thereby releasably secure clamp element 64 to rod 12. Screws 80 threaded into block 72 below grooves 74 therein are in perpendicular relationship to the axis of the bore defined by grooves 74, are in direct opposed alignment, and have outwardly projecting, externally disposed, cylindrical segments 82 defining pin means 86 adapted to be complementally received in corresponding slots 58. Polygonal recesses 84 in the outer faces of segments 82 facilitate threading of the pin means 86 into block 70 through utilization of an Allen wrench or the like.

In operation, blocks 70 and 72 are releasably secured to shaft 66 of rod 12 in a manner to cause the normally downwardly projecting portion 88 of handle 90 of rod 12 to be facing downwardly when faces 76 of blocks 70 and 72 are generally parallel with the ground. End 24 of bar 22 is threaded into recess 26 of artificial arm 14 so that coupling member 44 faces upwardly, as shown in FIGS. 2 and 3, when the fisherman has his forearm 92 in a location generally parallel with the ground, as shown in FIG. 1. The fisherman grasps handle 90 with his free hand and makes a cast with rod 12, this being possible with only one hand since the clutch and brake mechanism of reel 18 may be operated with the thumb as is conventional in these devices.

After the cast, the fisherman places the butt end of handle 90 in his mid-secion, as shown in FIG. 1, and artificial arm 14 is shifted in a manner to move coupling member 44 in a direction to cause pin means 86 of clamp element 44 to be received in corresponding slots 58. Rod 12 may thereby be held with artificial arm 14 by the fisherman pulling rearwardly on bar 22 which securely maintains pin means 86 in the lowermost parts of slots 58. The angularity of slots 58 permits firm holding of rod 12, yet does not interfere with quick disconnection of element 64 and thereby shaft 66 from coupling member 44 when desired.

While holding rod 12 with his artificial arm 14 in a manner as just described, the fisherman may operate reel 18 with his free hand in a conventional manner.

Assuming that the fisherman hooks a fish or that he desires to re-cast his bait, such action may be accomplished by grasping handle 90 with his free hand, pulling rod 12 backwardly to cause pin means 86 on clamping element 64 to slide rearwardly and upwardly in slots 58 until pin means 86 clear side portions 54 and 56, whereby rod 12 may then be moved in any direction desired.

The construction of coupling member 44 and clamping element 64 is extremely important because it permits very rapid disconnection of rod 12 from artificial arm 14 whenever the exigencies require fast action. It has been determined that through utilization of device 10, a handicapped fisherman may utilize rod 12 with an effectiveness approaching that of unhandicapped sportsmen and without modification of the arm appliance or the rod being required.

Having thus described the invention what is claimed as new and desired to be secured by Letters Patent is:

1. A fishing rod holding device for an artifical arm comprising a clamp element adapted to be releasably secured to a rod proximal to one end of the latter; pin means mounted on said element and extending outwardly therefrom to present a projection thereon; an elongated bar adapted to be interconnected at one end thereof to the extremity of an artificial arm; and a slotted coupling member secured to said bar at the other end of the latter and disposed on said element, said pin means being removably positioned in the slot of said member to operably couple said bar to said element, whereby as said rod is pulled by said arm toward the wearer thereof, said end of the rod engages the mid-section of said wearer and is forced outwardly thereby, to rigidly hold the rod in a fixed position relative to said wearer.

2. A fishing rod holding device for an artifical arm comprising a clamp element adapted to be releasably secured to a rod proximal to one end of the latter; pin means mounted on each side of said element and extending outwardly therefrom to present a pair of projections thereon; an elongated bar adapted to be interconnected at one end thereof to the extremity of an artificial arm; and a U-shaped coupling member secured to said bar at the other end of the latter and having a slot in each of the opposed sides thereof, said pin means being removably disposed in said slots to operably couple said bar to said element, whereby as said rod is pulled by said arm toward the wearer thereof, said end of the rod engages the mid-section of said wearer and is forced outwardly thereby, to rigidly hold the rod in a fixed position relative to said wearer.

3. A fishing rod holding device for an artificial arm comprising a clamp element adapted to be releasably secured to a rod proximal to one end of the latter and including a pair of blocks having said rod disposed therebetween; pin means mounted on one of said blocks and extending outwardly therefrom to present a projection thereon; an elongated bar adapted to be interconnected at one end thereof to the extremity of an artificial arm; and a slotted coupling member secured to said bar at the other end of the latter and disposed on said element, said pin means being removably received in the slot of said member to operably couple said bar to said element, whereby as said rod is pulled by said arm toward the wearer thereof, said end of the rod engages the mid-section of said wearer and is forced outwardly thereby, to rigidly hold the rod in a fixed position relative to said wearer.

4. A fishing rod holding device for an artificial arm comprising a clamp element adapted to be releasably secured to a rod proximal to one end of the latter and including a pair of blocks having said rod disposed therebetween; pin means mounted on each side of one of said blocks and extending outwardly therefrom to present a pair of projections thereon; an elongated bar adapted to be interconnected at one end thereof to the extremity of an artificial arm; and a U-shaped coupling member secured to said bar at the other end of the latter and having a slot in each of the opposed sides thereof, said pin means being removably disposed in said slots to operably couple said bar to said element, whereby as said rod is pulled by said arm toward the wearer thereof, said end of the rod engages the mid-section of said wearer and is forced outwardly thereby, to rigidly hold the rod in a fixed position relative to said wearer.

5. The invention of claim 2 wherein said U-shaped coupling member is provided with a pair of side portions and a bight portion therebetween, and including a shaft rigidly secured to said bight portion of said U-shaped member and extending outwardly therefrom, said bar being swingably mounted on said shaft and adapted to be threadably mounted on said arm.

6. The invention of claim 2 wherein each of said blocks is provided with a concave face engageable with the convex outer surface of said rod.

7. The invention of claim 2, each of said sides of said U-shaped member having an edge spaced from said bight portion, each of said slots having an open end in the corresponding edge and a closed end proximal to said bight portion.

8. The invention of claim 5, wherein said member is polygonal and said slots are obliquely disposed in said sides.

References Cited in the file of this patent

UNITED STATES PATENTS

| 953,821 | Dorrance | Apr. 5, 1910 |
| 1,711,447 | Colanduoni | Apr. 30, 1929 |
| 2,566,215 | La Croix | Aug. 28, 1951 |
| 2,704,412 | Davis | Mar. 22, 1955 |

FOREIGN PATENTS

| 107,069 | Great Britain | June 19, 1917 |